(12) United States Patent
Chen (10) Patent No.: US 10,834,319 B2
(45) Date of Patent: Nov. 10, 2020

(54) IMAGE CAPTURING DEVICE AND CONTROL METHOD THEREFOR

(71) Applicant: GETAC TECHNOLOGY CORPORATION, Hsinchu County (TW)

(72) Inventor: Min-Tai Chen, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/212,608

(22) Filed: Dec. 6, 2018

(65) Prior Publication Data

US 2020/0186711 A1   Jun. 11, 2020

(51) Int. Cl.
| | | |
|---|---|---|
| *G02B 5/20* | (2006.01) | |
| *H04N 5/232* | (2006.01) | |
| *H04N 5/225* | (2006.01) | |
| *H04N 5/33* | (2006.01) | |
| *H04N 5/374* | (2011.01) | |

(52) U.S. Cl.
CPC ......... *H04N 5/23245* (2013.01); *G02B 5/208* (2013.01); *H04N 5/2254* (2013.01); *H04N 5/2256* (2013.01); *H04N 5/33* (2013.01); *H04N 5/374* (2013.01)

(58) Field of Classification Search
CPC ... H04N 5/2252; H04N 5/2254; H04N 5/2257
See application file for complete search history.

(56) References Cited

U.S. PATENT DOCUMENTS

| | | | |
|---|---|---|---|
| 9,867,139 B1* | 1/2018 | Khasgiwala | H04W 52/367 |
| 10,313,589 B2* | 6/2019 | Chino | H04N 5/23245 |
| 2009/0087174 A1* | 4/2009 | Otsuka | H04N 5/23287 |
| | | | 396/55 |
| 2013/0278081 A1* | 10/2013 | Chien | G06F 1/3206 |
| | | | 307/121 |
| 2016/0335501 A1* | 11/2016 | Huang | G06K 9/00771 |

* cited by examiner

*Primary Examiner* — Brian T Pendleton
*Assistant Examiner* — Kyle M Lotfi (57) ABSTRACT

An image capturing device includes an optical lens, an imaging unit, a filter module, an infrared cut-off filter, a processing unit and a switching module. The filter module is located between the optical lens and the imaging unit. The infrared cut-off filter is provided on the filter module. The processing unit includes a first general-purpose input/output (GPIO) pin and a second GPIO pin. The switching module is coupled to the first GPIO pin and the second GPIO pin. When a first GPIO signal is in a first value, the switching module drives the filter module to move the infrared cut-off filter to an imaging optical path between the imaging unit and the optical lens. When a second GPIO signal is in the first value, the switching module drives the filter module to move the infrared cut-off filter away from the imaging optical path.

5 Claims, 6 Drawing Sheets

IMAGE CAPTURING DEVICE AND CONTROL METHOD THEREFOR

BACKGROUND OF THE INVENTION

Field of the Invention

The present invention relates to an imaging capturing device, and more particularly to an image capturing device and a control method therefor.

Description of the Prior Art

In general, a portable camera device can be used for capturing media data such as images and sounds. With the rise of safety awareness of the general public, a portable camera device, featuring portability convenience and instantaneous information capturing capabilities, can serve as a safety assisting device and is extensively applied in various fields, for example, in a vehicle driving recorder, a body-worn camera and an in-vehicle camera.

An image capturing device is configured with an infrared lighting module for facilitating capturing in a low-illuminance environment. An image capturing device is commonly provided with a switching module for switching the use of an infrared lighting module in response to environments of different illuminance levels. For example, an infrared lighting module is used at night but not used during the day.

SUMMARY OF THE INVENTION

During a movement process, an infrared cut-off filter in an infrared lighting module can be easily shifted due to excessively large vibration of the infrared lighting module, causing a color shift in a captured image and hence reduced imaging effects. Further, a poor imaging effect further increases complexities in subsequent image processing as well as the probability of failures in subsequent recognition.

According to an embodiment of the present invention, an image capturing device has a first operation mode and a second operation mode, and includes an optical lens, an imaging unit, a filter module, an infrared cut-off filter, a processing unit and a switching module. The filter module is located between the optical lens and the imaging unit. The infrared cut-off filter is provided on the filter module. The processing unit includes a first general-purpose input/output (GPIO) pin and a second GPIO pin. The switching module is coupled to the first GPIO pin and the second GPIO pin. The imaging unit captures an image through the optical lens.

When the image capturing device switches from the first operation mode to the second operation mode, the first GPIO pin of the processing unit outputs a first GPIO signal in a first value. Further, when the first GPIO signal is in the first value, the switching module drives the filter module to move the infrared cut-off filter to an imaging optical path between the imaging unit and the optical lens.

When the image capturing device switches from the second operation mode to the first operation mode, the second GPIO pin of the processing unit outputs a second GPIO signal in the first value. Further, when the second GPIO signal is in the first value, the switching module drives the filter module to move the infrared cut-off filter away from the imaging optical path.

In one embodiment, a control method for an image capturing device includes sensing a spatial change in the image capturing device by a gravity sensor to generate a sensing signal, comparing the sensing signal with a threshold, providing a first general-purpose input/output (GPIO) signal in a first value to move an infrared cut-off filter of the image capturing device to an imaging optical path when the sensing signal is greater than the threshold and the image capturing device is in a second operation mode, providing a second GPIO signal in the first value to move the infrared cut-off filter away from the imaging optical path when the sensing signal is greater than the threshold and the image capturing device is in a first operation mode, and providing the first GPIO signal in a second value and the second GPIO signal in the second value when the sensing signal is not greater than a threshold.

In conclusion, the image capturing device and the control method therefor according to the embodiments of the present invention are applicable to portable devices such as a driving vehicle recorder, a body-worn camera and an in-vehicle camera, and are capable of securely providing an infrared lighting module in response to illumination levels of an environment, thereby preventing vibration from causing a shift in the infrared cut-off filter, providing expected stable image colors and maintaining image quality.

DETAILED DESCRIPTION OF THE EMBODIMENTS

Terms such as "coupled" or "connected" used in the disclosure refer to direct mutual physical or electrical contacts or indirect physical or electrical contacts of two or more elements, and may also refer to mutual operations or actions of two or more elements. Ordinal terms such as "first", "second" and "third" used are for differentiating an element, region and part from another identical or similar element, region or part, and are not to be construed as defining a specific element, region or part.

Figure 1:
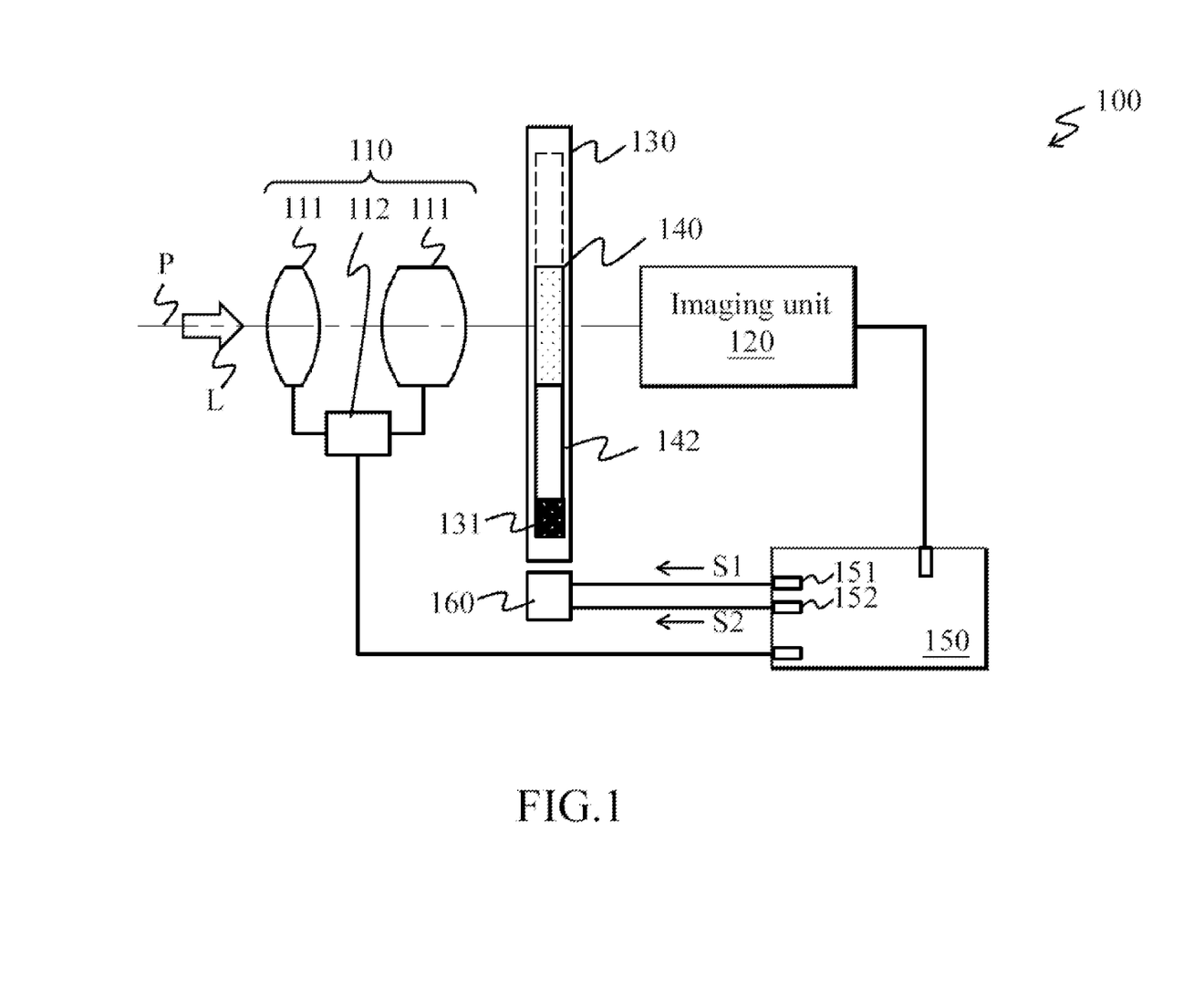
FIG. 1 is a configuration schematic diagram of an image capturing device according to an embodiment of the present invention.
Figure 2:
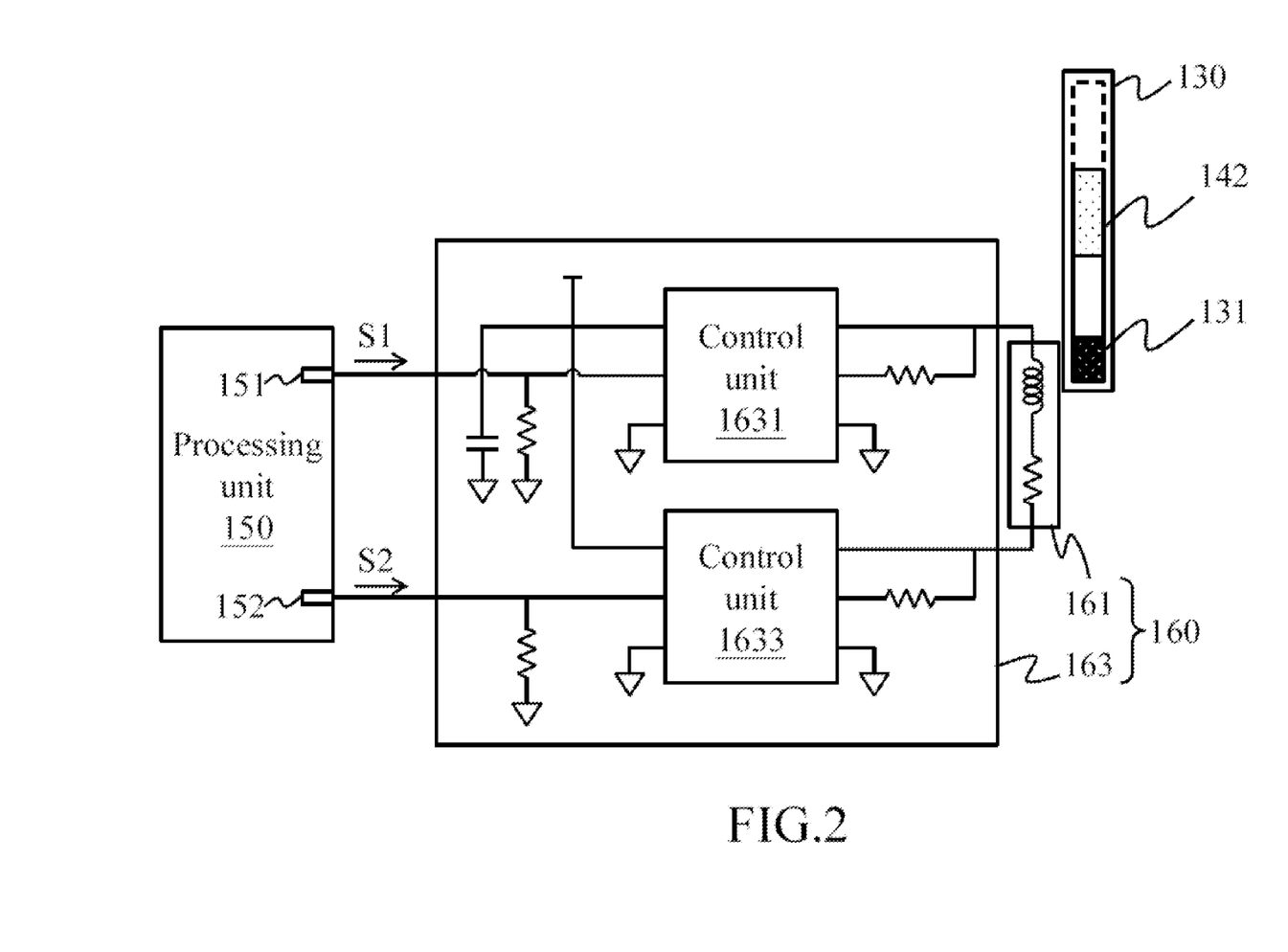
FIG. 2 is an exemplary circuit schematic diagram of a switching module in FIG. 1.

Referring to FIG. 1 and FIG. 2, in one embodiment, an image capturing device 100 includes an optical lens 110, an imaging unit 120, a filter module 130, an infrared cut-off filter 140, a processing unit 150 and a switching module 160. The switching module 160 includes a filter switch 161 and a driving circuit 163.

The infrared cut-off filter 140 is provided on the filter module 130, and the filter module 130 is located between the optical lens 110 and the imaging unit 120. The driving circuit 163 is coupled to the filter module 130 and the processing unit 150. The driving circuit 163 is further coupled to the filter switch 161, and the filter switch 161 is provided correspondingly to the filter module 130 and close to (or adhered to) the filter module 130.

The imaging unit 120 captures an image through the optical lens 110. At this point, the imaging unit 120 can capture an object through the optical lens 110 to generate an image. An imaging optical path P is formed between the imaging unit 120 and the optical lens 110.

The filter module 130 is located between the optical lens 110 and the imaging unit 120, and can adjust the position of the infrared cut-off filter 140. The infrared cut-off filter 140 is a filter for filtering out infrared light from light L so as to reduce the amount of infrared light entering the imaging unit 120. More specifically, the filter module 130 moves the infrared cut-off filter 140 to the imaging optical path P between the imaging unit 120 and the optical lens 110, or moves the infrared cut-off filter 140 away from the imaging optical path P between the imaging unit 120 and the optical lens 110. In one embodiment, the infrared cut-off filter 140 may completely block infrared light. In another embodiment, the infrared cut-off filter 140 may partly block infrared light. For example, the infrared cut-off filter 140 may filter out a partial range of wavelengths of infrared light.

In some embodiments, the image capturing device 100 may further include a transparent lens 142, and the transparent lens 142 is joined at one end of the infrared cut-off filter 140 and is provided on the filter module 130. When the infrared cut-off module 140 moves away from the imaging optical path P between the imaging unit 120 and the optical lens 110, the transparent lens 142 moves to the imaging optical path P between the imaging unit 120 and the optical lens 110. Conversely, when the infrared cut-off filter 140 moves to the optical path P between the imaging unit 120 and the optical lens 110, the transparent lens 142 moves away from the imaging optical path P between the imaging unit 120 and the optical lens 110. In one embodiment, the transparent lens 142 does not at all block infrared light.

The processing unit 150 includes a first general-purpose input/output (GPIO) pin 151 and a second GPIO pin 152. Two input ends of the driving circuit 163 are respectively coupled to the first GPIO pin 151 and the second GPIO pin 152, and an output end of the driving circuit 163 is coupled to the filter module 130. At this point, the driving circuit 163 can receive a first GPIO signal S1 from the first GPIO pin 151 and a second GPIO signal S2 from the second GPIO pin 152, and drive the filter module 130 according to the first GPIO signal S1 and the second GPIO signal S2.

More specifically, the image capturing device 100 has a first operation mode and a second operation mode. In some embodiment, the first operation mode is a night mode, and the second operation mode is a day mode.

When the image capturing device 100 switches from the first operation mode (e.g., a night mode) to the second operation mode (e.g., a day mode), the first GPIO pin 151 of the processing unit 150 outputs the first GPIO signal S1 in a first value to the driving circuit 163, and the driving circuit 163 drives the filter module 130 to move the infrared cut-off filter 140 to the imaging optical path P between the imaging unit 120 and the optical lens 110, such that the light L entering the optical lens 110 first passes through the infrared cut-off filter 140 and then arrives at the imaging unit 120. At this point, a component of infrared light in the light L is filtered out, preventing the imaging unit 120 from sensing infrared light that may cause the issue of color shift in the image, thereby rendering colors of the image to be closer to real colors.

When the image capturing device 100 switches from the second operation mode (e.g., the day mode) to the first operation mode (e.g., the night mode), the second GPIO pin 152 of the processing unit 150 outputs the second GPIO signal S2 in the first value to the driving circuit 163, and the driving circuit 163 drives the filter module 130 to move the infrared cut-off filter 140 away from the imaging optical path P between the imaging unit 120 and the optical lens 110, such that the light L passing through the optical lens 110 directly arrives at the imaging unit 120. At this point, in a situation of a night environment with inadequate light, the infrared cut-off filter 140 is moved away from the front of the imaging unit 120, and the image capturing device 100 can supplement light by an infrared light source (not shown), so that the imaging unit 120 can capture the component of infrared light in the light L and obtain a better image.

Figure 3:
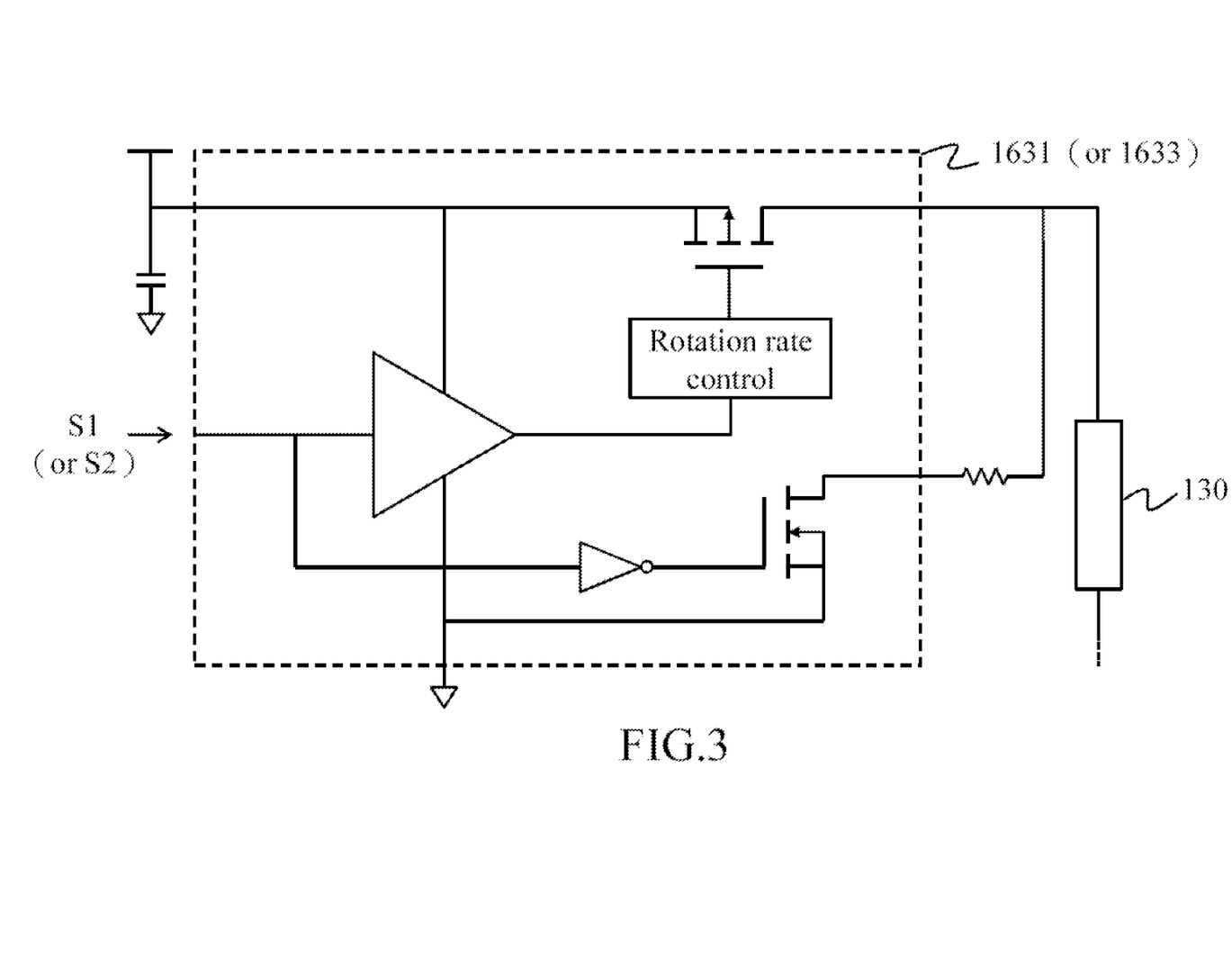
FIG. 3 is an exemplary circuit schematic diagram of any control unit in FIG. 2.
Figure 4:
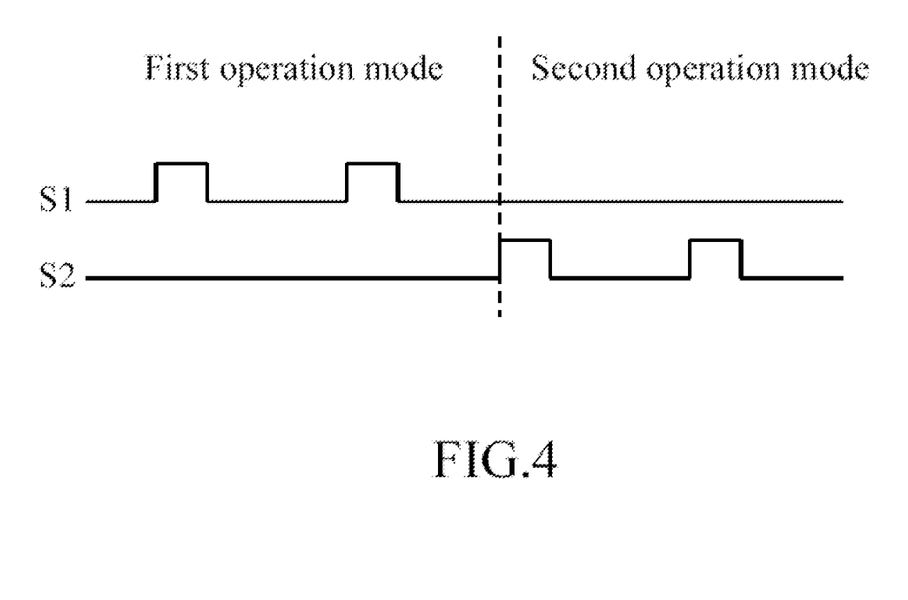
FIG. 4 is an exemplary timing diagram of a first general-purpose input/output (GPIO) signal and a second GPIO signal in FIG. 2.

In a first example, referring to FIG. 1 and FIG. 2, the driving circuit 163 includes two control units (respectively referred to as a first control unit 1631 and a second control unit 1633). An enable end of the first control unit 1631 is coupled to the first GPIO pin 151 of the processing unit 150, and an output end of the first control unit 1631 is coupled to one end of the filter switch 161. An enable end of the second control unit 1633 is coupled to the second GPIO pin 152, and an output end of the second control unit 1633 is coupled to the other end of the filter switch 161. In some embodiments, the circuit of a control unit (the first control unit 1631 or the second control unit 1633) can be as shown in FIG. 3.

In some embodiments, the filter module 130 can further include a magnetic element 131 (e.g., a magnet or an electromagnet), and the magnetic element 131 is provided on the infrared cut-off filter 140. Thus, by attracting or repulsing the magnetic element 131 through a magnetic field, the filter switch 161 drives the infrared cut-off filter 140 through the magnetic element 131 to move along a movement groove (not shown) of the filter module 130.

In the first example, referring to FIG. 1, FIG. 2, FIG. 3 and FIG. 4, when the first GPIO signal S1 in the first value and outputted by the processing unit 150 is at a high potential (or logic 1), the driving circuit 163 drives the filter module 130 in response to the first GPIO signal S1 at a high potential (or logic 1) to produce a magnetic field of a first direction (producing a forward magnetic force), so as to move the infrared cut-off filter 140 to the imaging optical path P between the imaging unit 120 and the optical lens 110. At this point, the image capturing device 100 switches from the first operation mode (the night mode) to the second operation mode (the day mode). When the first GPIO signal S1 in the second value and outputted by the processing unit 150 is at a low potential (or logic 0), the driving circuit 163 does not drive the filter module 130 in response to the first GPIO signal S1 at a low potential (or logic 0), such that the filter module 130 does not produce a magnetic field of the first direction (not producing a forward magnetic force). At this point, the image capturing device 100 is still maintained in the second operation mode (the day mode).

In a second example, referring to FIG. 1, FIG. 2, FIG. 3 and FIG. 4, when the second GPIO signal S2 in the first value and outputted by the processing unit 150 is at a high potential (or logic 1), the driving circuit 163 drives the filter module 130 in response to the second GPIO signal S2 at a high potential (or logic 1) to produce a magnetic field of a second direction (producing a reverse magnetic force), so as to move the infrared cut-off filter 140 away from the imaging optical path P between the imaging unit 120 and the optical lens 110. At this point, the image capturing device 100 switches from the second operation mode (the day mode) to the first operation mode (the night mode). When the second GPIO signal S2 in the second value and outputted by the processing unit 150 is at a low potential (or logic 0), the driving circuit 163 does not drive the filter module 130 in response to the second GPIO signal S2 at a low potential (or logic 0), and the filter module 130 does not produce a magnetic field of the second direction (not producing the reverse magnetic force). At this point, the image capturing device 100 is still maintained in the first operation mode (the night mode).

In a third example, the driving circuit 163 may further include two inverters (not shown), and two inputs ends of the two inverters are respectively coupled to the first GPIO pin 151 and the second GPIO pin 152, and two output ends of the two inverters are respectively coupled to the two control units (1631 and 1633). At this point, when the first GPIO signal S1 in the second value and outputted by the processing unit 150 is at a low potential (or logic 0), the driving circuit 163 outputs the first GPIO signal S1 in the first value and at a high potential (or logic 1) to drive the filter module 130. Thus, the filter module 130 produces a magnetic field of the first direction (producing a forward magnetic force) to move the infrared cut-off filter 140 to the imaging optical path P between the imaging unit 120 and the optical lens 110. At this point, the image capturing device 100 switches from the first operation mode (the night mode) to the second operation mode (the day mode). When the first GPIO signal S1 in the first value and outputted by the processing unit 150 is at a high potential (or logic 1), the driving circuit 163 outputs the first GPIO signal S1 in the second value and at a low potential (or logic 0) and does not drive the filter module 130, such that the filter module 130 does not produce a magnetic field of the first direction (not producing a forward magnetic force). At this point, the image capturing device 100 is still maintained in the second operation mode (the day mode).

In a fourth example, the driving circuit 163 may further include two inverters (not shown). Two input ends of the two inverters are respectively coupled to the first GPIO pin 151 and the second GPIO pin 152, and two output ends of the two inverters are coupled to the two control units (1631 and 1633). At this point, when the second GPIO signal S2 in the second value and outputted by the processing unit 150 is at a low potential (or logic 0), the driving circuit 163 outputs the second GPIO signal S2 in the first value and at a high potential (or logic 1) to drive the filter module 130, such that the filter module 130 produces a magnetic field of the second direction (producing a reverse magnetic force) to move the infrared cut-off filter 140 away from the imaging optical path P between the imaging unit 120 and the optical lens 110. At this point, the image capturing device 100 switches from the second operation mode (the day mode) to the first operation mode (the night mode). When the second GPIO signal S2 in the first value and outputted by the processing unit 150 is at a high level (or logic 1), the driving circuit 163 outputs the second GPIO signal S2 in the second value and at a low potential (or logic 0) and does not drive the filter module 130, such that the filter module 130 does not produce a magnetic field of the second direction (not producing a reverse magnetic force). At this point, the image capturing device 100 is maintained in the first operation mode (the night mode).

In one embodiment, the first GPIO signal S1 and the second GPIO signal S2 are two individual and independent signals.

Figure 5:
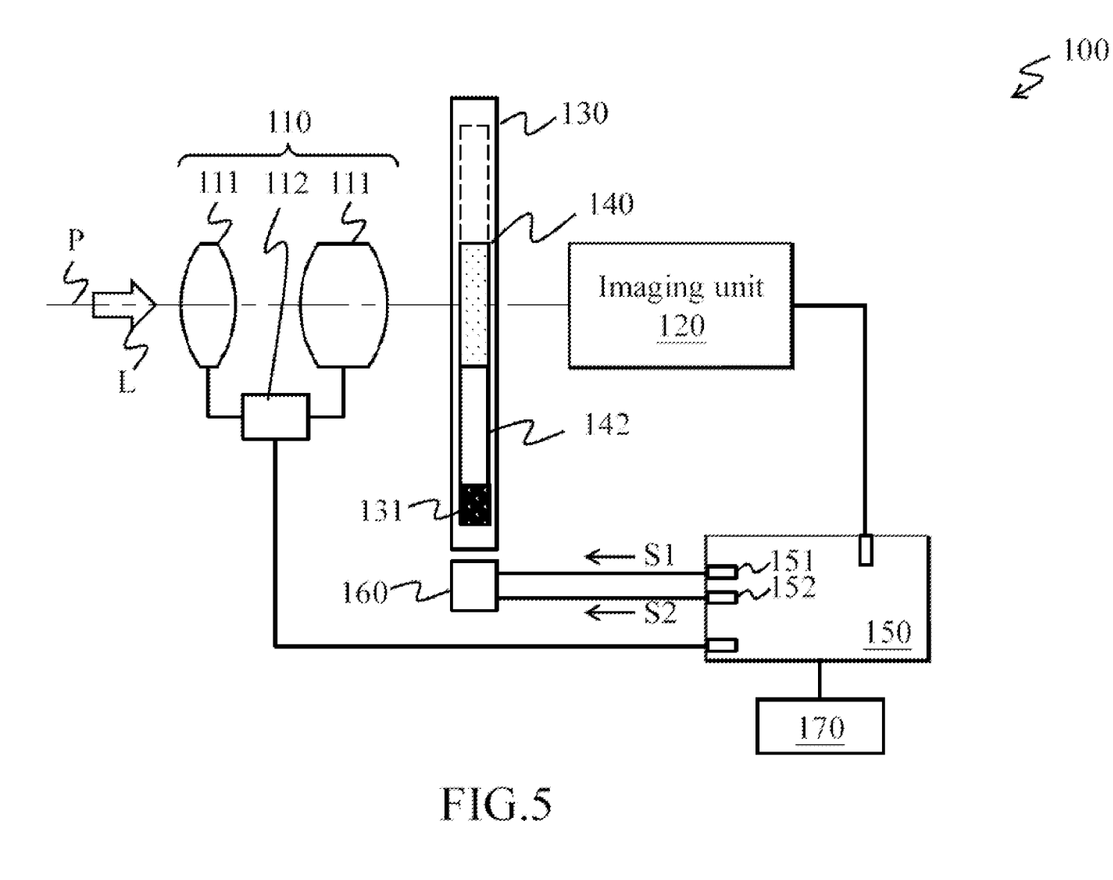
FIG. 5 is a configuration schematic diagram of an image capturing device according to another embodiment of the present invention.

In one embodiment, referring to FIG. 5, the image capturing device 100 may further include a gravity sensor (g-sensor) 170. The gravity sensor 170 is coupled to the processing unit 150, and is for sensing a spatial change in the image capturing device 100 to generate a sensing signal. The spatial change may be, for example but not limited to, a displacement change in any axial direction among the X axis, the Y axis and the Z axis.

The infrared cut-off filter 140 may be shifted from an original position due to a spatial change in the image capturing device 100; that is, the position of the infrared cut-off filter 140 is not adapted to the operation mode (the first operation mode and the second operation mode), such that the infrared cut-off filter 140 is at the imaging optical path P between the imaging unit 120 and the optical lens 110 in the first operation mode and a poor image is thus captured, or the infrared cut-off filter 140 leaves the imaging optical path P between the imaging unit 120 and the optical lens 110 in the second operation mode and a color shift is thus resulted in a captured image. For example, assume that the image capturing device 100 of the embodiment of the present invention is provided in a vehicle to capture conditions outside the vehicle (e.g., as a driving vehicle recorder) or inside the vehicle (e.g., as an in-vehicle camera for capturing a criminal at the back). When the vehicle moves on a bumpy road surface and an instantaneous intense vibration is caused, the image capture device 100 is moved along with the vehicle and may cause a shift in the position of the infrared cut-off filter 140.

To ensure that the infrared cut-off filter 140 is located at a correct position, different examples are described below.

In a first example, when the sensing signal is greater than a threshold, the processing unit 150 determines that a spatial change in the image capturing device 100 has occurred. In a situation where the image capturing device 100 is in the first operation mode (the night mode), when the sensing signal is greater than the threshold, that is, when a spatial change occurring in the image capturing device 100 in the night mode causes the infrared cut-off filter 140 to move to the imaging optical path P between the imaging unit 120 and the optical lens 110, the second GPIO pin 152 of the processing unit 150 outputs the second GPIO signal S2 in the first value to the driving circuit 163. At this point, the driving circuit 163 drives the filter module 130 to again move the infrared cut-off filter 140 away from the imaging optical path P between the imaging unit 120 and the optical lens 110.

In a second example, when the sensing signal is greater than the threshold, the processing unit 150 determines that a spatial change in the image capturing device 100 has occurred. In a situation where the image capturing device 100 is in the second operation mode (the day mode), when the sensing signal is greater than the threshold, that is, when a spatial change occurring in the image capturing device 100 in the day mode causes the infrared cut-off filter 140 to leave the imaging optical path P between the imaging unit 120 and the optical lens 110, the first GPIO pin 151 of the processing unit 150 outputs the first GPIO signal S1 in the first value to the driving circuit 163. At this point, the driving circuit 163 drives the filter module 130 to again move the infrared cut-off filter 140 back to the imaging optical path P between the imaging unit 120 and the optical lens 110.

In a third example, in a situation where the sensing signal is smaller than the threshold and the image capturing device 100 is in the first operation mode (the night mode) or the second operation mode (the day mode), the processing unit 150 determines that no spatial change in the image capturing device 100 has occurred and the infrared cut-off filter 140 is still kept as being away from the imaging optical path P between the imaging unit 120 and the optical lens 110, regardless of whether the image capturing device 100 is in the night mode; alternatively, the processing unit 150 determines that no spatial change in the image capturing device 100 has occurred and the infrared cut-off filter 140 is still kept on the imaging optical path P between the imaging unit 120 and the optical lens 110, regardless of whether the image capturing device 100 is in the day mode. In other words, when the sensing signal is smaller than the threshold, the processing unit 150 determines that no spatial change in the image capturing device 100 has occurred, and the infrared cut-off filter 140 is still kept at the correct position. The first GPIO pin 151 of the processing unit 150 outputs the first GPIO signal S1 in the second value to the driving circuit 163, and the second GPIO pin 152 of the processing unit 150 outputs the second GPIO signal S2 in the second value to the driving circuit 163. In response to the first GPIO signal S1 in the second value and in response to the second GPIO signal S2 in the second value, the driving circuit 163 does not drive the filter module 130. At this point, the filter module 130 does not produce a magnetic field of the first direction (not producing a forward magnetic force) and does not produce a magnetic field of the second direction (not producing a reverse magnetic force). Further, the infrared cut-off filter 140 corresponds to the operation mode of the image capturing device 100 and is kept at the correct position.

At this point, when the position of the infrared cut-off filter 140 is not adapted to the operation mode (the first operation mode and the second operation mode) due to a spatial change in the image capturing device 100, it is ensured through the gravity sensor 170 that the infrared cut-off filter 140 returns to the correct position according to a current operation mode of the image capturing device 100 and is not affected by an unintentional spatial change. When no spatial change occurs in the image capturing device 100 or the existence of such spatial change does not cause a displacement in the position of the infrared cut-off filter 140 (that is, the infrared cut-off filter 140 is adapted to the operation mode), the driving circuit 163 can still keep the infrared cut-off filter 140 at the correct position according to a current operation mode of the image capturing device 100.

Figure 6:
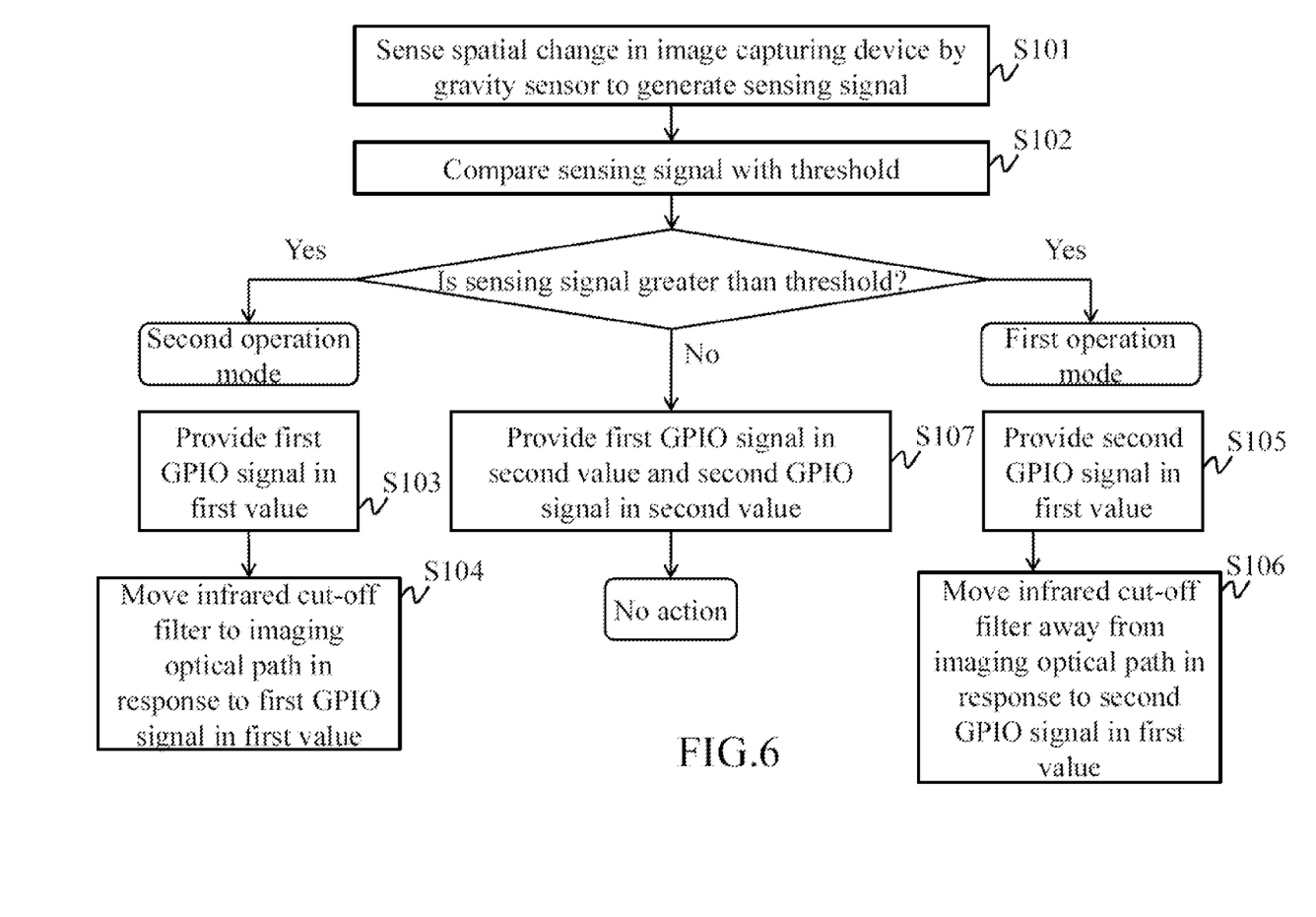
FIG. 6 is a flowchart of a control method for an image capturing device according to an embodiment of the present invention.

Referring to FIG. 5 and FIG. 6, according to the above embodiments, the present invention further provides a control method for the image capturing device 100. In one embodiment, the control method for the image capturing device 100 includes sensing a spatial change in the image capturing device 100 by a gravity sensor 170 to generate a sensing signal (step S101), comparing the sensing signal with a threshold (step S102), providing the first GPIO signal S1 in the first value when the sensing signal is greater than the threshold and the image capturing device 100 is in the second operation mode (the day mode) (step S103) and moving the infrared cut-off filter 140 of the image capturing device 100 to the imaging optical path P in response to the first GPIO signal S1 in the first value, providing the second GPIO signal S2 in the first value when the sensing signal is greater than the threshold and the image capturing device 100 is in the first operation mode (the night mode) (step S105) and moving the infrared cut-off filter 140 away from the imaging optical path P in response to the second GPIO signal S2 in the first value (step S106), and providing the first GPIO signal S1 in the second value and the second GPIO signal S2 in the second value when the sensing signal is not greater than the threshold (step S107).

In some embodiments, in step S101, the gravity sensor 170 is coupled to the processing unit 150 to sense a displacement change of the image capturing device 100 in any axial direction among the X axis, the Y axis and the Z axis to generate a sensing signal.

In some embodiments, in step S102, after receiving the sensing signal from the gravity sensor 170, the processing unit 150 compares the sensing signal with the threshold to obtain an analysis result. The threshold refers to a displacement change threshold or a displacement change critical value of at least any one axial direction used for comparison. In some embodiments, the analysis result may be that the sensing signal is greater than the threshold or may be that the sensing signal is smaller than the threshold.

In some embodiments, in step S103 and step S104, when the sensing signal is greater than the threshold and the image capturing device 100 is in the second operation mode (the day mode), the processing unit 150 determines that a spatial change in the image capturing device 100 in the day mode has occurred such that the infrared cut-off filter 140 leaves the imaging optical path P between the imaging unit 120 and the optical lens 110. At this point, the first GPIO pin 151 of the processing unit 150 outputs the first GPIO signal S1 in the first value to the driving circuit 163, such that the driving circuit 163 drives the filter module 130 to again move the infrared cut-off filter 140 back to the imaging optical path P between the imaging unit 120 and the optical lens 110.

In some embodiments, in step S105 and step S106, when the sensing signal is greater than the threshold and the image capturing device 100 is in the first operation mode (the night mode), the processing unit 150 determines that a spatial change in the image capturing device 100 in the night mode has occurred such that the infrared cut-off filter 140 moves to the imaging optical path P between the imaging unit 120 and the optical lens 110. At this point, the second GPIO pin 152 of the processing unit 150 outputs the second GPIO signal S2 in the first value to the driving circuit 163, such that the driving circuit 163 drives the filter module 130 to again move the infrared cut-off filter 140 away from the imaging optical path P between the imaging unit 120 and the optical lens 110.

In some embodiments, in step S107, when the sensing signal is smaller than the threshold, regardless of whether the image capturing device 100 is in the first operation mode (the night mode) or the second operation mode (the day mode), the processing unit 150 determines that no spatial change in the image capturing device 100 has occurred and the infrared cut-off filter 140 is kept at the correct position. In other words, in the first operation mode (the night mode), the processing unit 150 can determine that no spatial change in the image capturing device 100 has occurred and the infrared cut-off filter 140 is still kept away from the imaging optical path P between the imaging unit 120 and the optical lens 110. Alternatively, in the second operation mode (the day mode), the processing unit 150 can determine that no spatial change in the image capturing device 100 has occurred and the infrared cut-off filter 140 is still maintained on the imaging optical path P between the imaging unit 120 and the optical lens 110. At this point, the first GPIO pin 151 of the processing unit 150 outputs the first GPIO signal S1 in the second value to the driving circuit 163, and the second GPIO pin 152 of the processing unit 150 outputs the second GPIO signal S2 in the second value to the driving circuit 163. In response to the first GPIO signal S1 in the second value and the second GPIO signal S2 in the second value, the driving circuit 163 does not drive the filter module 130. At this point, the filter module 130 does not produce a magnetic field of a first direction (not producing a forward magnetic force) and does not produce a magnetic field of a second direction (not producing a reverse magnetic force).

In some embodiments, the optical lens 110 may include a plurality of lenses 111 and a zoom motor 112. The motor 112 is coupled to the lenses 111 and causes the lenses 111 to displace so as to focus the optical lenses 110.

In some embodiments, the imaging unit 120 may include a photosensitive element, e.g., a charge-coupled device (CCD) or a complementary metal-oxide semiconductor (CMOS).

In some embodiments, the processor 150 may be a microprocessor, a microcontroller, a digital signal processor, a central processing unit, or any analog and/or digital devices operating a signal based on an operation instruction.

In conclusion, the image capturing device and the control method therefor according to the embodiments of the present invention are applicable to portable devices such as a driving vehicle recorder, a body-worn camera and an in-vehicle camera, and are capable of securely providing an infrared lighting module in response to illumination levels of an environment, thereby preventing vibration from causing a shift in the infrared cut-off filter, providing expected stable image colors and maintaining image quality.

What is claimed is:

1. An image capturing device, having a first operation mode and a second operation mode, the image capturing device comprising:
    an optical lens;
    an imaging unit, capturing an image through the optical lens;
    a filter module, located between the optical lens and the imaging unit;
    an infrared cut-off filter, provided on the filter module;
    a processing unit, comprising a first general-purpose input/output (GPIO) pin and a second GPIO pin; wherein, when the image capturing device switches from the first operation mode to the second operation mode, the first GPIO pin of the processing unit outputs a first GPIO signal in a first value, and when the image capturing device switches from the second operation mode to the first operation mode, the second GPIO pin of the processing unit outputs a second GPIO signal in the first value;
    a switching module, coupled to the first GPIO pin and the second GPIO pin; wherein, when the first GPIO signal is in the first value, the switching module drives the filter module to move the infrared cut-off filter to an imaging optical path between the imaging unit and the optical lens, and when the second GPIO signal is in the first value, the switching module drives the filter module to move the infrared cut-off filter away from the imaging optical path; and
    a gravity sensor, sensing a spatial change in the image capturing device to generate a sensing signal;
    wherein, when the sensing signal is greater than a threshold and the image capturing device is in the second operation mode, the first GPIO pin of the processing unit outputs the first GPIO signal in the first value, and when the sensing signal is greater than the threshold and the image capturing device is in the first operation mode, the second GPIO pin of the processing unit outputs the second GPIO signal in the first value;
    wherein when the sensing signal is not greater than the threshold, the first GPIO pin of the processing unit outputs the first GPIO signal in a second value and the second GPIO pin of the processing unit outputs the second GPIO signal in the second value.

2. The image capturing device according to claim 1, wherein when the first GPIO signal is in the first value, the filter module produces a magnetic field of a first direction in response to a driving signal of the switching module so as to move the infrared cut-off filter to the imaging optical path between the imaging unit and the optical lens; and when the second GPIO signal of the second GPIO pin is in the first value, the filter module produces a magnetic field in a second direction in response to the driving signal of the switching module so as to move the infrared cut-off filter away from the imaging optical path.

3. The image capturing device according to claim 1, wherein the first GPIO signal and the second GPIO signal are two individual and independent signals.

4. A control method for an image capturing device, comprising:
    sensing a spatial change in the image capturing device by a gravity sensor to generate a sensing signal;
    comparing the sensing signal with a threshold;
    when the sensing signal is greater than the threshold and the image capturing device is in a second operation mode, providing a first general-purpose input/output (GPIO) signal in a first value so as to move an infrared cut-off filter of the image capturing device to an imaging optical path;
    when the sensing signal is greater than the threshold and the image capturing device is in a first operation mode, providing a second GPIO signal in the first value so as to move the infrared cut-off filter away from the imaging optical path; and
    when the sensing signal is not greater than the threshold, providing the first GPIO signal in a second value and the second GPIO signal in the second value.

5. The control method for an image capturing device according to claim 4, wherein the first GPIO signal and the second GPIO signal are two individual and independent signals.

* * * * *